US009519472B2

(12) United States Patent
McLeod et al.

(10) Patent No.: US 9,519,472 B2
(45) Date of Patent: Dec. 13, 2016

(54) AUTOMATION OF VIRTUAL MACHINE INSTALLATION BY SPLITTING AN INSTALLATION INTO A MINIMAL INSTALLATION AND CUSTOMIZATION

(75) Inventors: Ian Scott McLeod, Chicago, IL (US); Christopher Lalancette, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 346 days.

(21) Appl. No.: 13/303,651

(22) Filed: Nov. 23, 2011

(65) Prior Publication Data

US 2013/0132950 A1    May 23, 2013

(51) Int. Cl.
*G06F 9/455* (2006.01)
*G06F 9/445* (2006.01)

(52) U.S. Cl.
CPC .............. *G06F 8/63* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 2006/0085785 A1 | 4/2006 | Garrett | |
| 2008/0082976 A1* | 4/2008 | Steinwagner et al. | 718/1 |
| 2009/0007105 A1* | 1/2009 | Fries et al. | 718/1 |
| 2009/0077551 A1 | 3/2009 | Whiteley | |
| 2009/0300076 A1* | 12/2009 | Friedman | G06F 11/3664 |
| 2010/0306759 A1* | 12/2010 | Kohler et al. | 717/174 |
| 2011/0078681 A1 | 3/2011 | Li et al. | |
| 2011/0126207 A1* | 5/2011 | Wipfel et al. | 718/104 |
| 2011/0153697 A1* | 6/2011 | Nickolov | G06F 9/4856 |
| | | | 707/827 |
| 2011/0302580 A1 | 12/2011 | Iikura et al. | |
| 2012/0084769 A1* | 4/2012 | Adi et al. | 717/174 |
| 2012/0260228 A1* | 10/2012 | Mallick et al. | 717/104 |
| 2013/0276068 A1* | 10/2013 | Alwar | G06F 21/53 |
| | | | 726/4 |

OTHER PUBLICATIONS

DMTF; Open Virtualization Format Specification; Feb. 22, 2009; Version 1.0.0.*

(Continued)

*Primary Examiner* — Dong Kim
(74) *Attorney, Agent, or Firm* — Lowenstein Sandler LLP (57) ABSTRACT

A server computing system receives a request to instantiate a virtual machine in a cloud. The request is associated with a template that specifies the operating system and software packages to be installed on the virtual machine. The system splits the installation of the virtual machine into creating a minimal operating system installation, customizing the minimal installation, and generating a disk image of the customized minimal installation. The system creates a minimal installation of the specified operating system, executes the minimal operating system in a virtual machine guest, and customizes the minimal installation of the operating system as specified in the template. The system generates a virtual machine disk image of the customized minimal installation that is a cloud generic virtual machine disk image an is configurable to instantiate the virtual machine in clouds provided by different cloud providers.

20 Claims, 9 Drawing Sheets

(56) References Cited

OTHER PUBLICATIONS http://web.archive.org/web/20100513082445/http://en.wikipedia.org/wiki/Open_Virtualization_Format; May 13, 2010.*
Susestudio.com, "A Revolutionary New Way to Create Technology," as downloaded on Nov. 23, 2011 from http://susestudio.com, 2 pages.
Advisory Action for U.S. Appl. No. 13/403,824, mailed Mar. 3, 2016, 5 pages.
Final Office Action for U.S. Appl. No. 13/403,824, mailed Nov. 20, 2015, 13 pages.
Non-Final Office Action for U.S. Appl. No. 13/403,824, mailed Nov. 20, 2015, 12 pages.

\* cited by examiner

```
<template>
    <name>fedora14_postgres</name>
    <os>
        <name>Fedora</name>
        <version>14</version>
        <arch>x86_64</arch>
        <install type='iso'>
            <iso>http://example.org/fedora-14-x86_64.iso</iso>
        </install>
    </os>
    <description>Fedora 14 x86_64 with postgres</description>
    <packages>
        <package name='postgresql-server'/>
    </packages>
</template>
```

AUTOMATION OF VIRTUAL MACHINE INSTALLATION BY SPLITTING AN INSTALLATION INTO A MINIMAL INSTALLATION AND CUSTOMIZATION

TECHNICAL FIELD

Embodiments of the present invention relate to installation of virtual machines. Specifically, the embodiments of the present invention relate to automation of virtual machine installation by splitting an installation into a minimal installation and customization of a virtual machine.

BACKGROUND

Cloud computing is quickly becoming the platform of choice for businesses that want to reduce operating expenses and be able to scale resources rapidly. Eased automation, flexibility, mobility, resiliency, and redundancy are several other advantages of moving resources to the cloud. On-premise private clouds allow businesses to take advantage of cloud technologies while remaining on a private network. Public clouds allow businesses to make use of resources provided by third party vendors. Hybrid clouds allow the best of both public and private cloud computing models. Many organizations are being introduced to cloud computing by building an on-premise Infrastructure-as-a-Service (IaaS) cloud, which delivers computing, storage, and networking resources to users. Some organizations utilize cloud computing technology in an evolutionary way that leverages and extends their existing infrastructure and maintains portability across different technology stacks and providers.

Virtual machine instances in cloud computing are, for the most part, ephemeral. The state of a virtual machine is not persistent and is lost at shut down. A set of virtual machines can be launched with a particular configuration in a cloud one day and can be launched in a different cloud provider environment the next day. Enterprise application designers typically need to configure the interactions of a particular system with external resources, such as storage, network systems with particular properties, public services which are accessible in well-known ways, or other machines in close (or even distant) proximity to the system being configured. Traditional solutions require application developers to manually define and set up configuration files of various sorts. At deployment, an extensive amount of time and work is dedicated to setting up the configuration on each individual machine, in order to get the machine to communicate with other systems, resources, etc. Conventional efforts at automating installation of virtual machines using the mechanisms provided by the operating system vendor often fail because too much customization is attempted at the time of installation. Such traditional solutions are prone to error and do not provide a debug environment to identify the cause of the error.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for creating and customizing a minimal installation of a virtual machine. A server computing system receives a request to instantiate a virtual machine in a cloud. The request can be for more than one virtual machine. The request is associated with a template that specifies the operating system and software packages to be installed on the virtual machine. The server computing system splits the installation of the virtual machine into creating a minimal operating system installation, customizing the minimal installation, and generating a disk image of the customized minimal installation. The server computing system creates a minimal installation of the specified operating system, executes the minimal operating system in a virtual machine guest, and customizes the installed minimal operating system by installing the software packages as specified in the template. Finally the server computing system generates a virtual machine disk image of the customized minimal installation of the operating system to be used to instantiate the virtual machine in the cloud. The virtual machine disk image is a cloud generic virtual machine disk image that is configurable to instantiate the virtual machine in clouds provided by different cloud providers.

Embodiments use the native operating system (OS) tools for the installation to ensure that after installation, the disk image that is created is the same as if the installation media had been used on a bare-metal machine. The use of a known good input and native OS tools reduce the chance of failure during installation. Embodiments provide debugging features to create a more efficient installation and customization environment for virtual machines.

Figure 1:
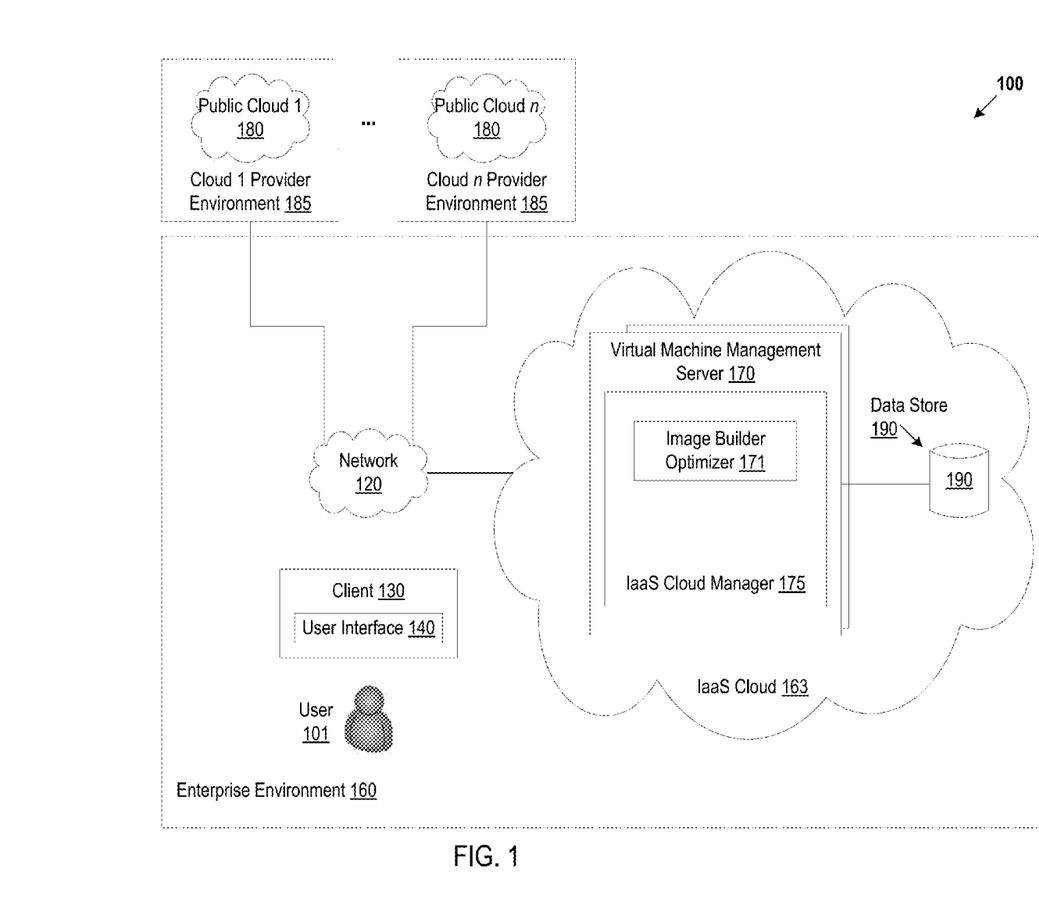
FIG. 1 is an exemplary network architecture in which embodiments of the present invention may operate.

FIG. 1 is an exemplary network architecture 100 in which embodiments of the present invention can be implemented. In one embodiment, an enterprise can build and manage their own Infrastructure-as-a-Service (IaaS) cloud 163 in the enterprise environment 160 for internal consumption. An IaaS cloud 163 delivers infrastructure, such as computing, storage, and networking resources, to users. In another embodiment, the IaaS cloud 163 can be built by and managed by a third-party outside of the enterprise environment 160. The network 120 can be a public network (e.g., Internet) or a private network (e.g., a local area network (LAN)).

An enterprise can use the IaaS cloud 163 to ramp up new services or reallocate computing resources rapidly, based on business needs. The enterprise environment 160 can include one or more virtual machine management servers 170 to allow the enterprise to integrate physical servers and virtualization platforms from other vendors, such as public clouds 180 from third-party cloud provider environments 185, with the enterprise environment 160 to allow the enterprise to scale cloud resources. A server 170 can be hosted by any type of computing device including server computers, gateway computers, desktop computers, laptop computers, hand-held computers or similar computing device. A public cloud 180 has an infrastructure that is made available to the general public or a large industry group. A public cloud 180 can be owned by an organization selling cloud services, also known as a cloud provider. Examples of public clouds 180 and cloud provider environments 185 can include, and are not limited to, an Amazon® Elastic Compute Cloud (Amazon EC2) from Amazon.com, Inc., a Rackspace® public cloud from Rackspace® Hosting, Inc., a public cloud from a Red Hat® Certified Cloud Provider, a VMware vSphere™ cloud from Vmware, Inc., and a Eucalyptus® cloud from Eucalyptus Systems, Inc. In one embodiment, a virtual machine management server 170 is hosted in an IaaS cloud 163 within the enterprise environment 160 and communicating with the private cloud 161 and one or more third-party public clouds 180 over one or more networks 120. In another embodiment, a virtual machine management server 170 is hosted in a private cloud 160.

A virtual machine management server 170 can include an IaaS cloud manager 175 to create and manage IaaS cloud resources for hybrid, public, and private clouds. A hybrid cloud has an infrastructure that is a composition of two or more clouds (e.g., private, community, or public) that remain unique entities, but are bound together by standardized or proprietary technology that enables data and application portability (e.g., loadbalancing between clouds). The IaaS cloud manager 175 can include an image builder optimizer 171 to receive a request, for example, initiated by a user 101, for a build of one or more virtual machines. The request can reference a template representing the operating system and software packages to be installed on the virtual machine. The request can be for a virtual machine in a specific public cloud 180. An enterprise user 101, such as a system administrator, can use a client 130 to initiate a build of a virtual machine, for example, via a user interface 140. The user interface 140 can be a command-line interface, a browser, or a similar application.

The image builder optimizer 171 can optimize the build of the requested virtual machine by first installing a known minimally functional version of the requested operating system (OS) and customizing the installed minimally functional version of the OS inside a virtual machine running the minimal OS. The image builder optimizer 171 can start a build from scratch by creating a Just Enough Operation System (JeOS), which is a minimal OS, and can customize the JeOS disk image with the addition or removal of software to meet the specifications in the template associated with the request. Embodiments for creating and customizing a minimal OS installation for a build of a virtual machine is described in greater detail below in conjunction with FIGS. 2-7.

The image builder optimizer 171 can store the customized JeOS disk image in a data store 190 that is coupled to the image builder optimizer 171. The customized JeOS disk image is a cloud generic virtual machine disk image that is configurable to instantiate at least one virtual machine in cloud 163 or in clouds 180 provided by different cloud provider environments 185. The data store 190 can be an image warehouse to store disk images for future use. A data store 190 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 2:
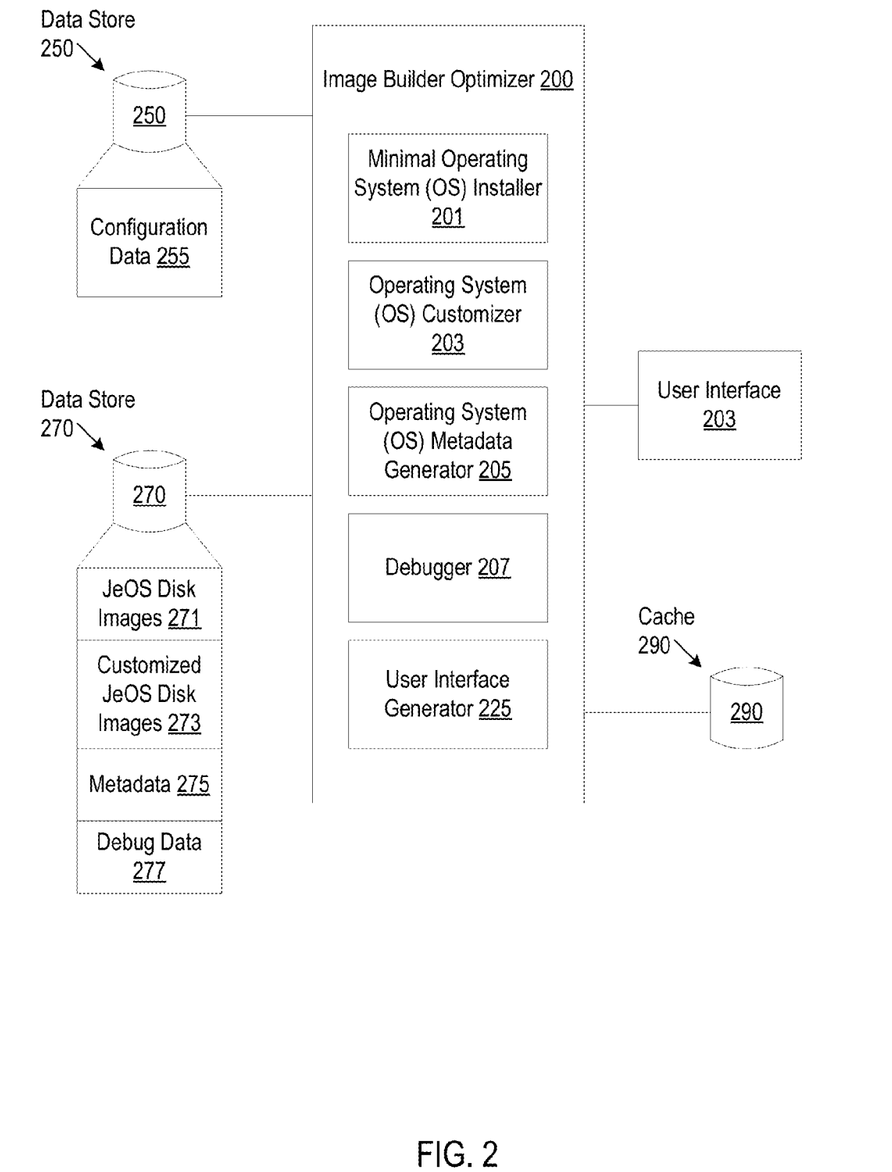
FIG. 2 is a block diagram of one embodiment of an image builder optimizer.

FIG. 2 is a block diagram of one embodiment of an image builder optimizer 200 for creating and customizing a minimal installation of a virtual machine. In one embodiment, the image builder optimizer 200 can be the same as the image builder optimizer 171 hosted by a server 170 of FIG. 1. The image builder optimizer 200 can include a minimal operating system (OS) installer 201, an operating system (OS) customizer 203, an operating system (OS) metadata generator 205, a debugger 207, and a user interface (UI) generator sub-module 225.

The minimal OS installer 201 can receive a request to create a build of a virtual machine. The minimal OS installer 201 can receive the request as user input via a user interface 203 provided by the user interface generator 225. Examples of a user interface 203 can include, and are not limited to, a command line interface and a graphical user interface (GUI). The request can be for a build for one or more virtual machines in a cloud provided by a particular cloud provider. The request can reference a template representing the operating system and software packages to be installed on the virtual machine. Examples of operating systems can include, and are not limited to, a Linux kernel based operating system, a Windows operating system, a Mac operating system, a Unix operating system, and a Unix-like operating system. An example of software packages can include, and is not limited to, a user package, for example, an application server package, a web server package, a database management system package, a proxy system package, and user supplied packages and files. The template can specify, for example, and is not limited to, an operating system, a version of the OS, an architecture for the OS, and a location of installation media for the operating system. A template can be user-defined. The template can be an XML file. In one embodiment, processing logic stores the template in a data store 250 that is coupled to the image builder optimizer 200.

The minimal OS installer 201 can automatically install a minimal operating system, such as a Just Enough Operating System (JeOS), into files that represent disk images based on the operating system specified in the template. The minimal OS installer 201 can generate a virtual machine disk image of the minimal installation of the operating system, also hereinafter referred to as a Just enough Operating System (JeOS) disk image, and can store the JeOS disk image 271 in a data store 270 according to a location specified in configuration data 255 stored in a data store 250. The image builder optimizer 200 can be coupled to one or more data stores 250,270. For example, the configuration data 255 can specify that JeOS disk images 271 are to be stored in a directory "/var/lib/libvirt/images" in data store 270. One embodiment of automatically installing a JeOS based on a template and generating a JeOS disk image is described in greater detail below in conjunction with FIG. 4.

The OS customizer 203 can automatically modify the operating system files that are installed by the minimal OS installer 201 to customize an installed operating system as specified in a template. The OS customizer 203 can locate package identifiers in a template to determine which software packages and/or files to install. The OS customizer 203 can use remote commands and native operating system tools (e.g., yum, apt-get, etc.) to install the additional software packages and/or files into the operating system. The OS customizer 203 can locate a JeOS disk image 271 that corresponds to the request in the data store 270 based on a location specified in the configuration data 255. The OS customizer 203 can generate a virtual machine disk image of the customized minimal installation of the operating system, also hereinafter referred to as a customized JeOS disk image. The OS customizer 203 can store the customized JeOS disk image 273 in a data store 270 based on a location specified in configuration data 255. One embodiment of customizing the minimal operating system and generating a customized JeOS disk image is described in greater detail below in conjunction with FIG. 4.

The configuration data 255 can define the one or more paths to use for storing virtual machine disk images (e.g., JeOS disk images 271, customized JeOS disk images 273), the image descriptors for the virtual machine disk images, and the disk files for the virtual machine's disks. The configuration data 255 can be implemented as configuration file is in standard INI (initialization) format. The configuration data 255 can specify a cache 290 to store data to be used by the image builder optimizer 200 for subsequent requests that are the same for installations and customizations already performed. One embodiment of caching data for creating and customizing a minimal installation of a virtual machine is described in greater detail below in conjunction with FIG. 4.

The debugger 207 can enable debugging features for the installation and customization of the minimal OS. If errors occur during the installation and/or the customization, the debugger 207 can provide debug data 277 to help a user identify the cause of an error in the debug environment. The debugger 207 can receive user input via the user interface 203 to enable the debugging features. For example, the debugger 207 can receive user input via a command-line interface command that includes a parameter to log debug data 277 for an installation and/or a customization to a data store 270. The parameter can specify a type of log level to use. Examples of log levels can include, and are not limited to, logging errors only, logging errors and warnings, logging errors, warning, and information, logging all messages, and logging all messages prepended with the level and a class name. The user interface generator 225 can generate a user interface 203 providing the debug data 277 to a user.

The OS metadata generator 205 can generate metadata 275 for the customized minimal operating system after installation of the customized minimal operating system. The metadata 275 can include a package manifest, also hereinafter referred to as an ICICLE (Image Content and Intended Configuration LanguagE). The ICICLE provides a listing of detailed software revisions and configuration parameters of the entities created from the installation. The OS metadata generator 205 can store the metadata 275 in a data store 270 based on configuration data 255. One embodiment of generating a package manifest is described in greater detail below in conjunction with FIG. 8.

Figure 3:
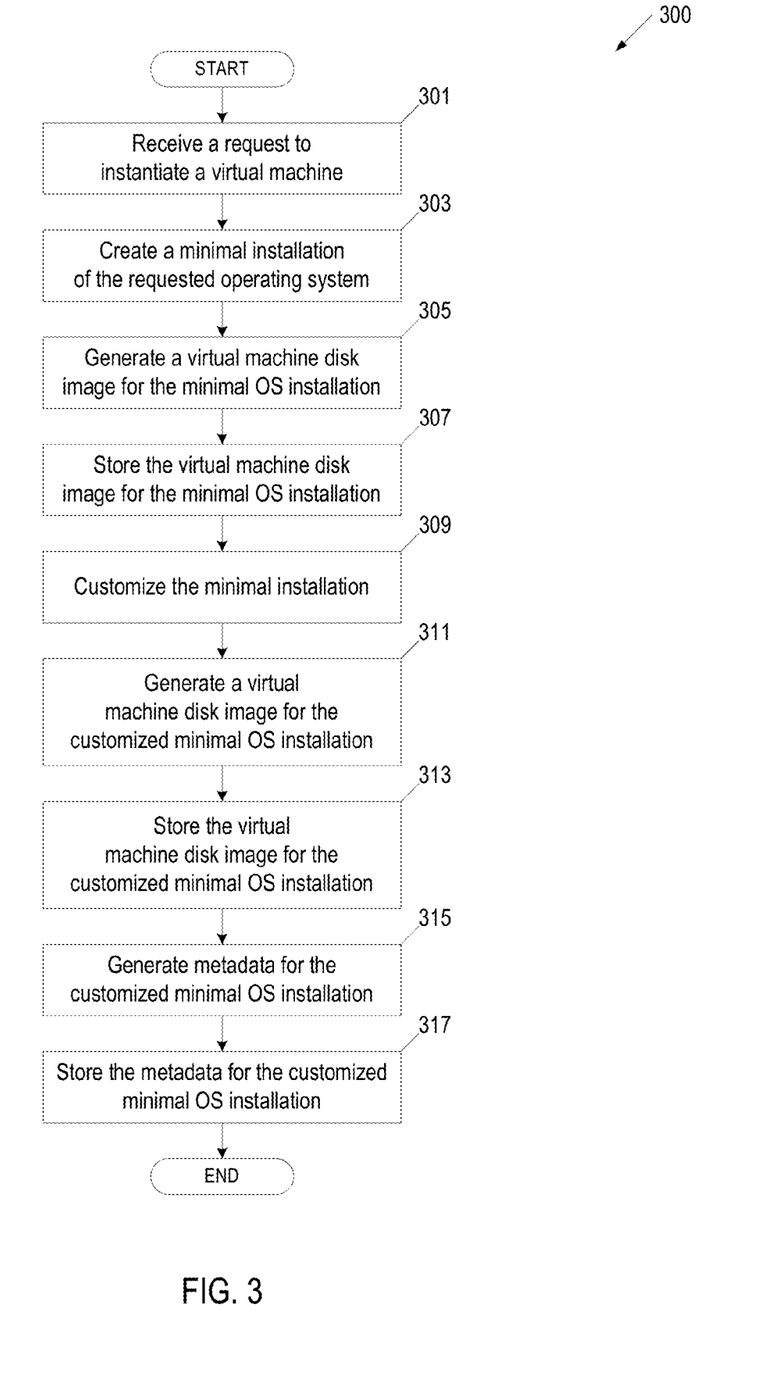
FIG. 3 is a flow diagram of an embodiment of a method for creating and customizing a minimal installation of a virtual machine.

FIG. 3 is a flow diagram of an embodiment of a method 300 for creating and customizing a minimal installation of a virtual machine. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the image builder optimizer 171 hosted by a server 170 of FIG. 1.

At block 301, processing logic receives a request to instantiate at least one virtual machine in a target cloud. The target cloud can be a public or private cloud. The request can reference a template representing the operating system and software packages to be installed on the virtual machine. At block 303, processing logic creates a minimal installation of the requested operating system as specified by the template. Processing logic can automatically install an operating system into files that represent disk images. One embodiment of creating a minimal installation of an operating system is described in greater detail below in conjunction with FIG. 4. In one embodiment, processing logic enables debugging features for the installation. Processing logic can determine whether the installation of the minimal OS is successful. If errors occur during the installation, processing logic can provide debug data to a user to identify the cause of the errors. In one embodiment, processing logic can make multiple installation attempts until the minimal OS is successfully installed.

In response to a successful installation of a minimally functional operating system, processing logic generates a virtual machine disk image of the minimal installation of the operating system (JeOS disk image) at block 305. A virtual machine disk image consists of an image descriptor and a number of disk files for the virtual machine's disks. The image descriptor can be implemented as an XML descriptor, such as an XML file. One embodiment of generating a JeOS disk image is described in greater detail below in conjunction with FIG. 4. At block 307, processing logic stores the JeOS disk image in a data store that is coupled to the image builder optimizer.

At block 309, processing logic customizes the minimal installation of the operating system based on specifications in the template. Processing logic runs the minimal operating system installation in a virtual machine and installs additional software packages and/or files into the minimal operating system. One embodiment of customizing the minimal operating system is described in greater detail below in conjunction with FIG. 6. In one embodiment, processing logic enables debugging features for the customization. Processing logic can determine whether the customization of the installed minimal OS is successful. If errors occur during the customization, processing logic can provide debug data to a user to identify the cause of the errors. In one embodiment, processing logic can make multiple customization attempts until the installed minimal OS is successfully customized. In response to a successful customization of the installed minimally functional operating system, processing logic generates a virtual machine disk image of the customized minimal installation of the operating system (customized JeOS disk image) at block 311. One embodiment of creating a customized JeOS disk image is described in greater detail below in conjunction with FIG. 4. At block 313, processing logic stores the customized JeOS disk image in the data store. The customized JeOS disk image includes an image descriptor and a number of disk files for the virtual machine's disks. The image descriptor of the customized JeOS disk image can subsequently be formatted to be compatible with one or more cloud provider environments. At block 315, processing logic generates metadata for the customized minimal operating system after installation and stores the metadata in the data store at block 317. One embodiment of generating a package manifest is described in greater detail below in conjunction with FIG. 8.

Figure 4:
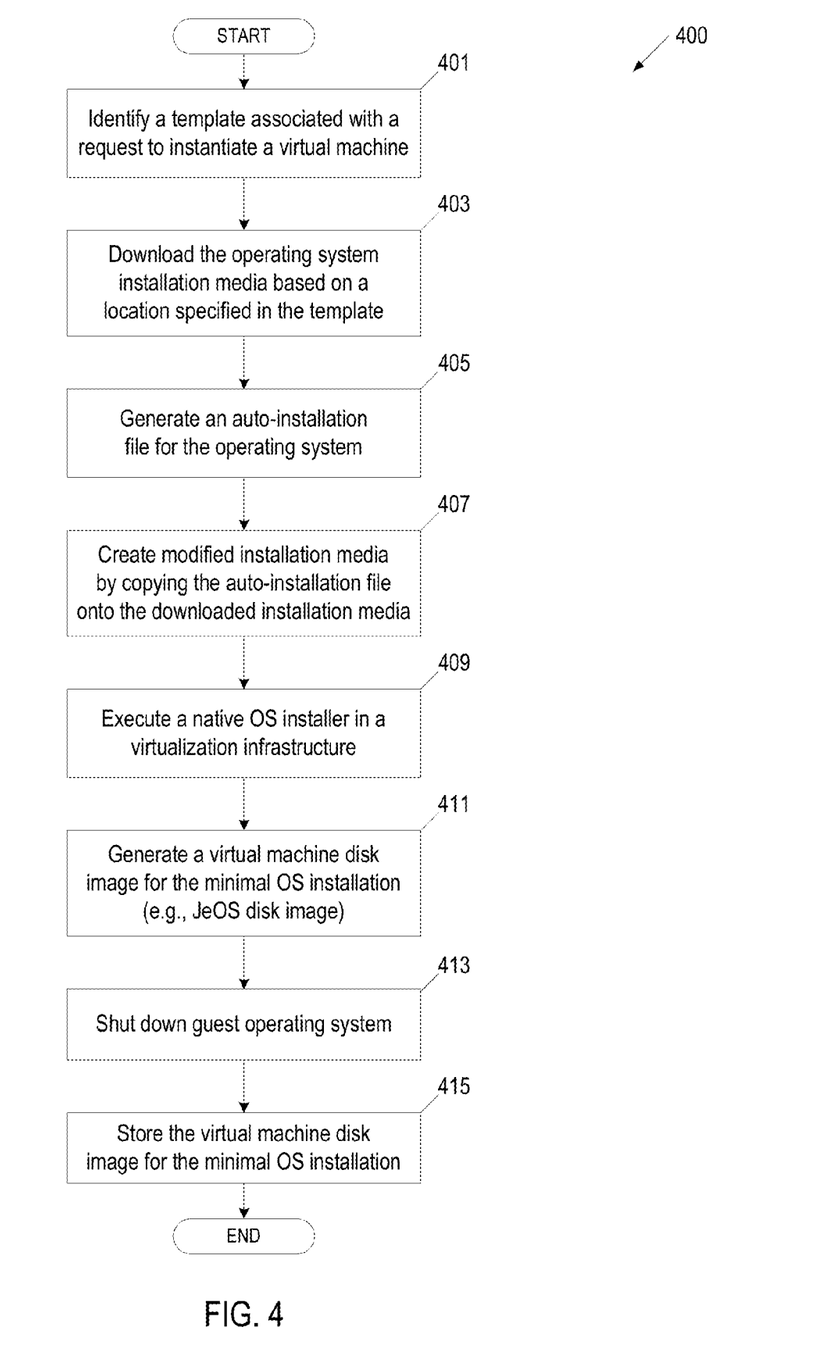
FIG. 4 is a flow diagram of an embodiment of a method for creating a minimal installation of an operating system.

FIG. 4 is a flow diagram of an embodiment of a method 400 for creating a minimal installation of an operating system. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the image builder optimizer 171 hosted by a server 170 of FIG. 1.

Figure 5:
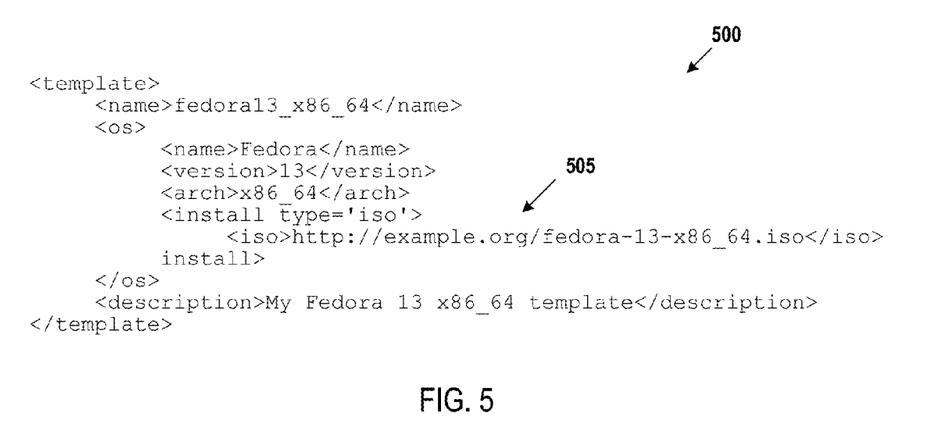
FIG. 5 illustrates an exemplary template.

In one embodiment, a minimal installation of an operating system can include installation media of an operating system and an automated installation file. At block 401, processing logic identifies a template that is associated with a request to instantiate a virtual machine. For example, processing logic receives a request as a command-line interface command referencing the path to the location of the template. The template can specify, for example, and is not limited to, an operating system, a version of the operating system, an architecture for the operating system, and a location of installation media for the operating system. The template can be an XML file. FIG. 5 illustrates an exemplary template 500 that is an XML template for a request to instantiate a virtual machine running a Fedora® 13×86_64 operating system. The template 500 includes a location identifier 505 for the location of the installation media for the operating system (e.g., Fedora® 13×86_64 operating system) specified in the template. Examples of a location identifier 505 can include, and are not limited to, a Uniform Resource Locator (URL) and a path name.

Returning to FIG. 4, processing logic downloads the operating system installation media based on the location data in the template at block 403. Processing logic can store the downloaded installation media in a cache. At block 405, processing logic generates an automated installation (auto-installation) file for the operating system specified in the template, according to one embodiment. In another embodiment, processing logic uses a user provided auto-installation file received as user input. An auto-installation file is a file, which when executed, automatically performs unattended operating system installation and configuration. Examples of types of auto-installation files can include, and are not limited to, kickstart, preseed, and sif (e.g., winnt.sif). Processing logic can generate an auto-installation file by executing a command from an auto-installation package. For example, processing logic can run a system-config-kickstart command to generate a kickstart file.

At block 407, processing logic creates modified installation media by copying the auto-installation file into the downloaded installation media. At block 409, processing logic executes a native operating system installation program, also known as a native OS installer, in a guest operating system in a virtualization infrastructure, for example, in a Kernel-based Virtual Machine (KVM) infrastructure, to install the files for the minimal operating system in a virtual machine. Processing logic can pass a parameter to the native OS installer at boot time to instruct the native OS installer to use the auto-installation file in the modified installation media. Examples of a native OS installer can include, and are not limited to, Anaconda for Linux®, Windows® OS Installer, Mac® OS Installer. In one embodiment, processing logic can use an emulator, such as QEMU, with a virtualization infrastructure (e.g, KVM) to run a native OS installer to install the minimal operating system. Processing logic can use a daemon and management tool, such as libvirt, to manage the virtualization infrastructure (e.g., KVM) when installing the minimal operating system.

At block 411, processing logic generates a virtual machine disk image for the minimal operating system (JeOS disk image). Processing logic can use a virtual machine monitor and/or a third-party vendor software tool to create the virtual machine disk image for the minimal operating system. A virtual machine disk image is a file on a physical disk, which has a particular format and is interpreted by a virtual machine monitor as a hard disk. A virtual machine disk image for a certain virtual machine monitor has a specific file type extension, e.g., .vmdk for VMware® VMDK (Virutal Machine Disk Format), .vhd for Xen® and Microsoft® Hyper-V®, .vdi for Oracle® VM VirtualBox, etc.

At block 413, processing logic shuts down the guest operating system at the end of the installation and stores the virtual machine disk image (JeOS disk image) for the minimal OS installation in the data store that is coupled to the image builder optimizer according to a location specified in configuration data at block 415. Processing logic uses configuration data that is stored in the data store to define the one or more paths to use for storing the virtual machine image, the image descriptor, and the disk files for the virtual machine's disks for the minimal operating system. Processing logic uses configuration data that is stored in the data store to define the one or more paths to use to cache the original installation media to avoid having to download the installation media a next time an installation for the same operating system is requested. Processing logic uses configuration data that is stored in the data store to define the one or more paths to use to cache the modified installation media to avoid having to download and modify the modified installation media a next time an installation for the same operating system is requested. Processing logic uses configuration data that is stored in the data store to define the one or more paths to use to cache the installed operating system after installation to significantly speed up a subsequent installation of the same operating system. Processing logic uses configuration data that is stored in the data store to define the one or more paths to use to cache the customized installed operating system to significantly speed up a subsequent installation of the same operating system and software packages. Processing logic uses configuration data that is stored in the data store to define the one or more paths to use to store screenshots of failed installations.

For example, processing logic receives a request to instantiate a virtual machine running a Fedora® 13×86_64 operating system. A template associates with the request includes the URL of the installation media for the Fedora® 13×86_64 operating system. Processing logic downloads the installation media from the specified location, creates a kickstart file, and adds the kickstart file to the downloaded installation media. Processing logic runs an automated installation in a KVM guest operating system using the kickstart file in the installation media. If the installation succeeds, the minimal Fedora® 13×86_64 operating system is installed on a file as specified by configuration data, such as a default file location (e.g., /var/lib/libvirt/images/fedora13_x86_64.dsk). If debugging features are enabled for the installation and if errors occur during the installation, processing logic can provide debug data to a user to help identify the cause of an error in the debug environment.

Figure 6:
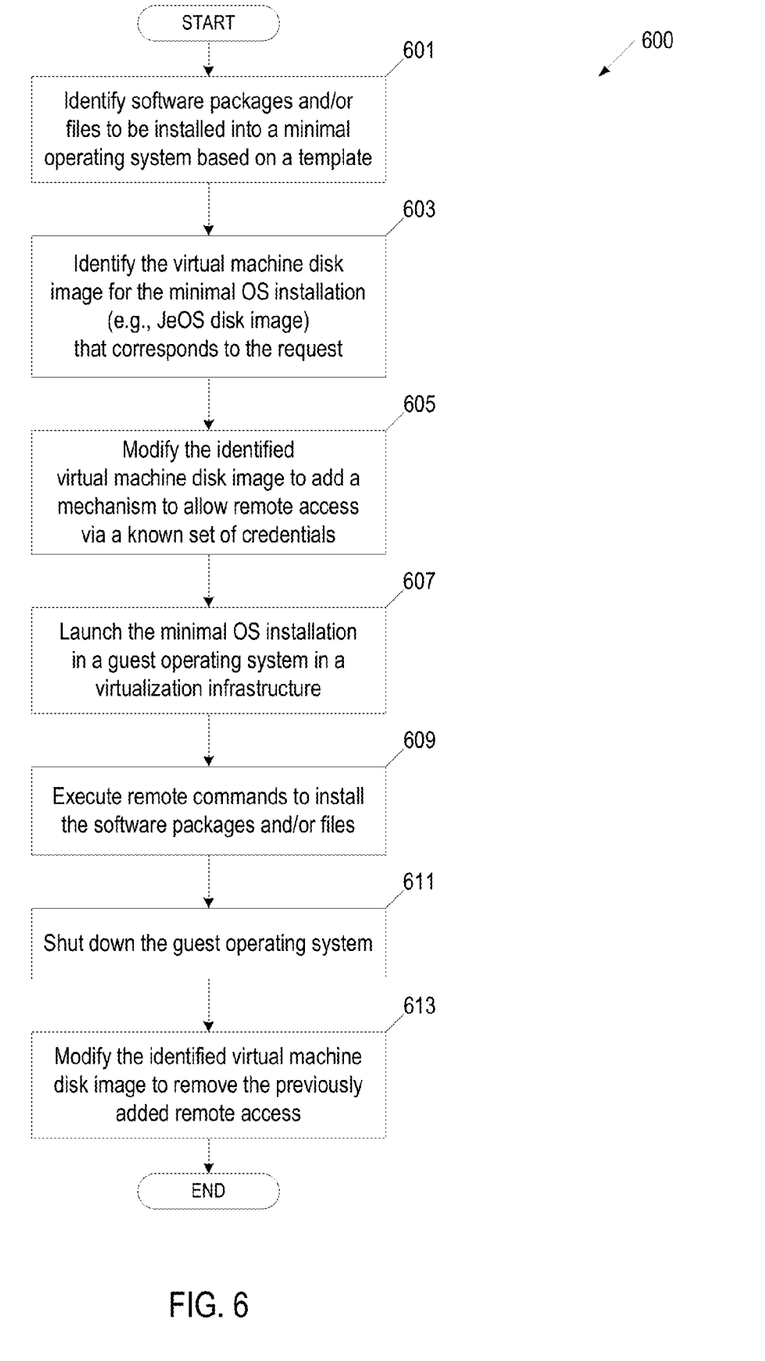
FIG. 6 is a flow diagram of an embodiment of a method for installing software packages and/or files into a minimal operating system to customize the minimal operating system.

FIG. 6 is a flow diagram of an embodiment of a method 600 for installing software packages and/or files into a minimal operating system to customize the minimal operating system. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the image builder optimizer 171 hosted by a server 170 of FIG. 1.

Figure 7:
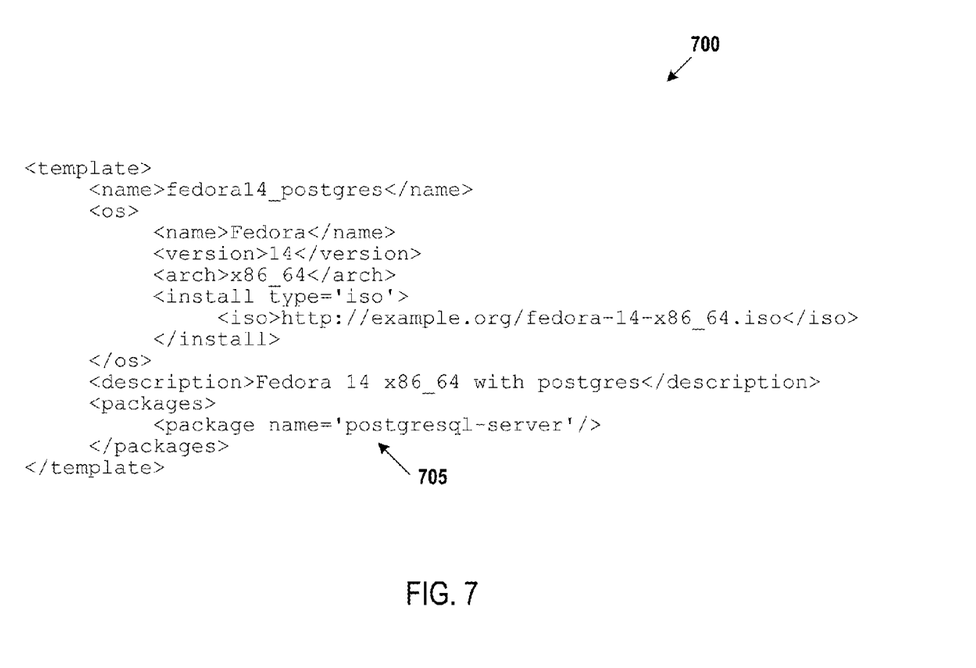
FIG. 7 illustrates an exemplary template.

At block 601, processing logic identifies one or more software packages and/or files to install into a minimal operating system based on a template that is associated with a request to instantiate a virtual machine. FIG. 7 illustrates an exemplary template 700 that is an XML template for a request to instantiate a virtual machine running a Fedora® 14 x86_64 operating system and an object-relational database management system PostgreSQL®. The template 700 can include one or more package identifiers 705 of software packages to be installed. For example, template 700 includes the package identifier <package name='postgresql-server'/>.

Returning to FIG. 6, processing logic identifies a virtual machine disk image of a minimal operating system (e.g., JeOS disk image) that corresponds to the request at block 603. Processing logic can locate the JeOS disk image using the path data specified in configuration data that is stored in a data store. At block 605, processing logic modifies the identified virtual machine disk image (e.g., JeOS disk image) to add a mechanism to allow remote access via a known set of credentials and launches the minimal OS installation in a guest operating system in a virtualization infrastructure (e.g., KVM infrastructure) at block 607.

At block 609, processing logic executes remote commands (e.g., ssh, etc.) and native OS tools (e.g., yum, apt-get, etc.) to install the software packages and/or files as specified in the template. At block 611, processing logic shuts down the guest operating system and modifies the JeOS disk image to remove the previously added remote access at block 613. Processing logic can remove the previously added remote access mechanism and credentials while preserving any remote access mechanisms that are already present in the minimal operating system installation or added during the customization of the minimal operating system installation.

For example, processing logic receives a request to instantiate a virtual machine running a Fedora® 14 x86_64 operating system and creates a JeOS disk image of an installed minimal Fedora® 14 x86_64 operating system at /var/lib/libvirt/images/fedora14_86_64.dsk. The request is to also install the PostgreSQL® object-relational database management system on the Fedora® 14 x86_64 operating system. Processing logic modifies the disk image at /var/lib/libvirt/images/fedora14_86_64.dsk for remote access and boots the operating system in a KVM guest operating system. Processing logic runs native OS commands, such as 'yum-y install postgresql-server', to install the PostgreSQL® package. If the installation succeeds, the minimal Fedora® 14 x86_64 operating system with the PostgreSQL® package is installed on a file at /var/lib/libvirt/images/fedora14_postgres.dsk. If debugging features are enabled for the customization, processing logic can provide debug data for any errors that occur during the customization.

Figure 8:
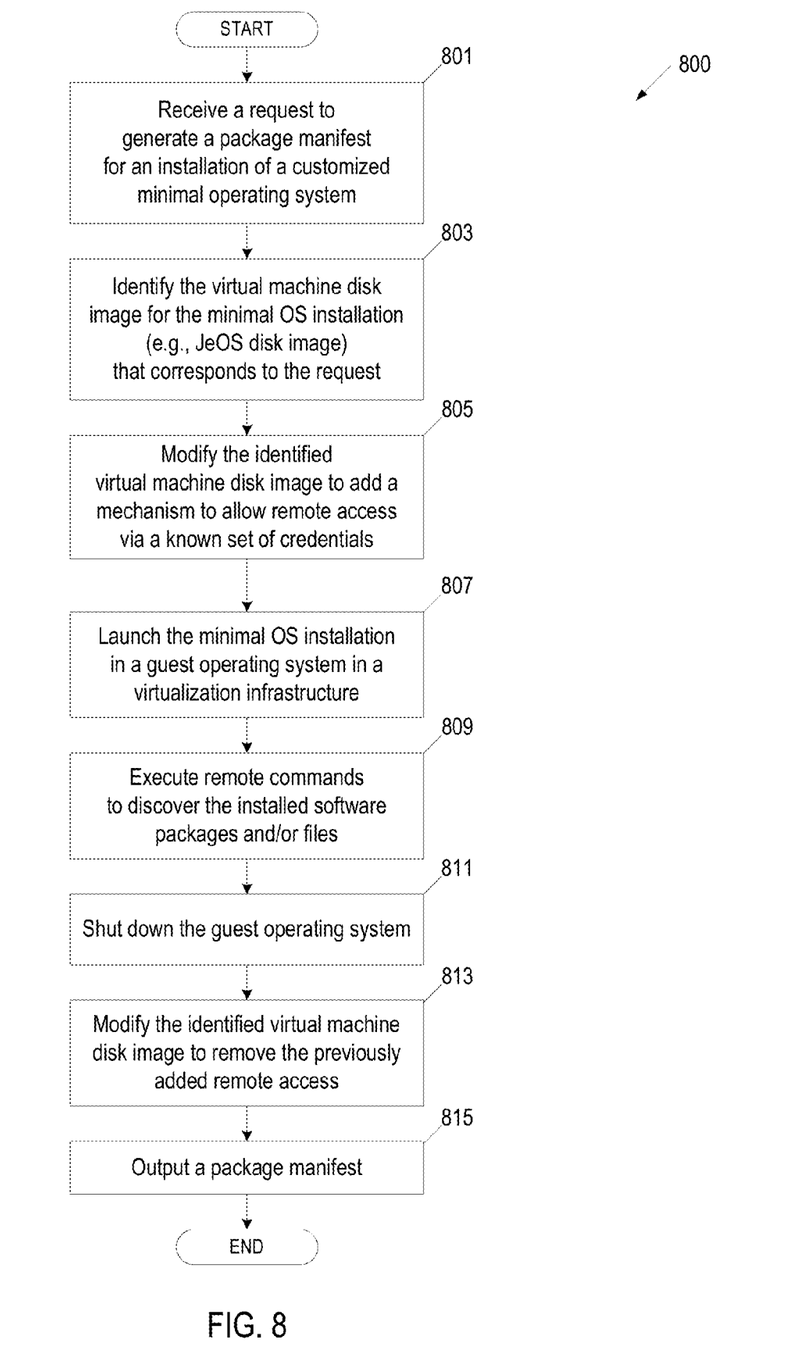
FIG. 8 is a flow diagram of an embodiment of a method for generating a package manifest of a customized minimal operating system.

FIG. 8 is a flow diagram of an embodiment of a method 800 for generating a package manifest of a customized minimal operating system. Method 800 can be performed by processing logic that can comprise hardware (e.g., circuitry, dedicated logic, programmable logic, microcode, etc.), software (e.g., instructions run on a processing device), or a combination thereof. In one embodiment, method 800 is performed by the image builder optimizer 171 hosted by a server 170 of FIG. 1.

At block 801, processing logic receives a request to generate a package manifest for an installed customized minimal operating system. The request can be received as a command-line interface command with a parameter to generate the package manifest. At block 803, processing logic identifies a virtual machine disk image of the minimal OS (e.g., JeOS disk image) for the request. Processing logic can locate the JeOS disk image using the path data specified in configuration data that is stored in a data store. At block 805, processing logic modifies the identified virtual machine disk image (e.g., JeOS disk image) to add a mechanism to allow remote access via a known set of credentials and launches the minimal OS installation in a guest operating system in a virtualization infrastructure (e.g., KVM infrastructure) at block 807.

At block 809, processing logic executes remote commands to discover the installed software packages and/or files. Processing logic can use native OS commands (e.g., rpm-qa) to query all of the software packages and/or files in the operating system. At block 811, processing logic shuts down the guest operating system and modifies the JeOS disk image to remove the previously added remote access at block 813. Processing logic can remove the previously added remote access mechanism and credentials while preserving any remote access mechanisms that are already present in the minimal operating system installation or added during the customization of the minimal operating system installation. At block 815, processing logic outputs a package manifest for the customized minimal operating system. The package manifest can be an XML document describing the entire manifest.

For example, processing logic receives a request to generate a package manifest for an installed Red Hat® Enterprise Linux® 5 x86_64 operating system. Processing logic modifies the disk image for remote access and boots the Red Hat® Enterprise Linux® 5 x86_64 operating system in a KVM guest operating system. Processing logic runs native OS commands, such as "rpm-qa", to query the installed packages, and outputs an XML document describing the manifest of the installation.

Figure 9:
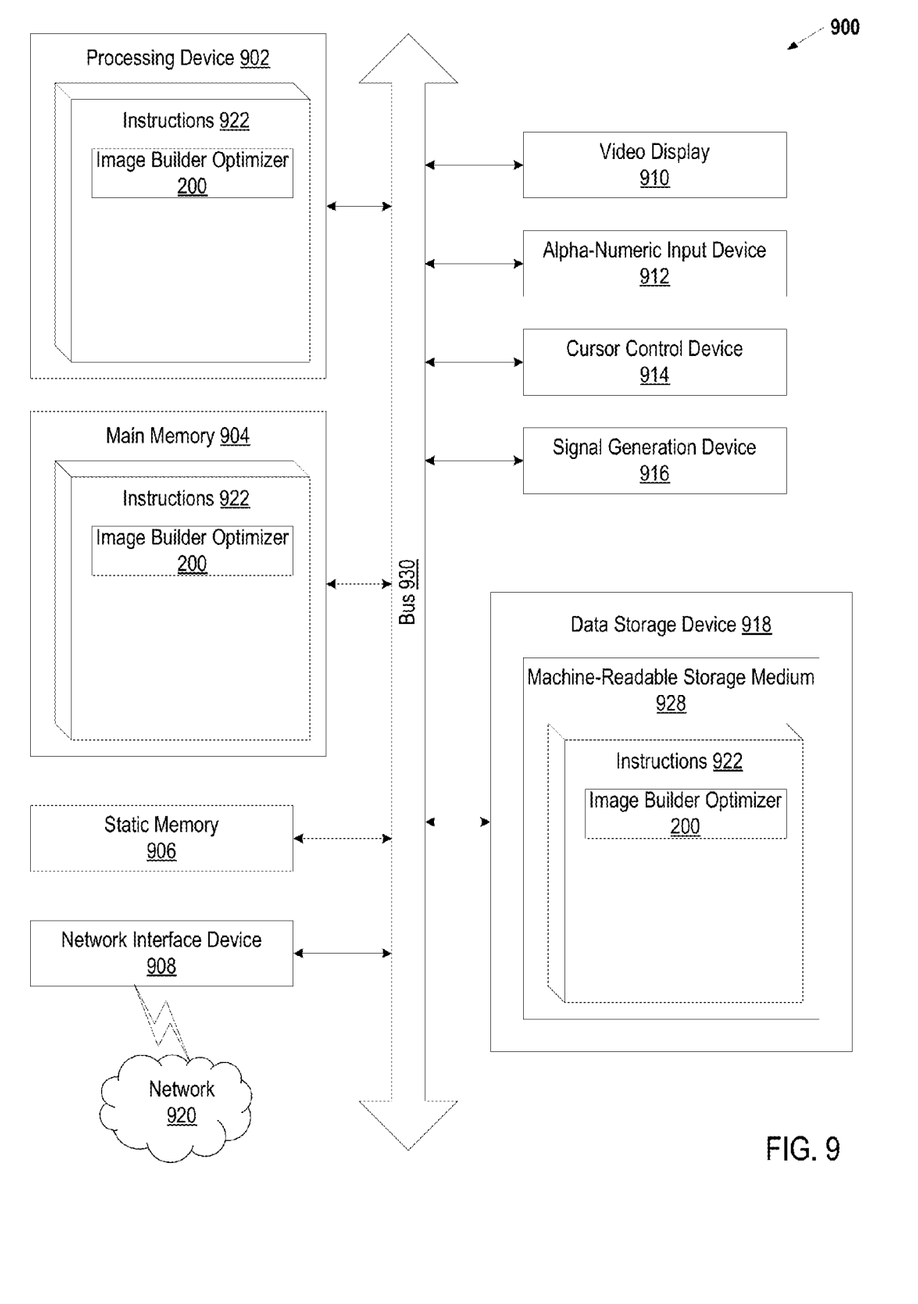
FIG. 9 is a diagram of one embodiment of a computer system for creating and customizing a minimal installation of a virtual machine.

FIG. 9 illustrates a diagram of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM), double data rate (DDR SDRAM), or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 922 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928 (also known as a computer-readable medium) on which is stored one or more sets of instructions or software 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting machine-readable storage media.

In one embodiment, the instructions 922 include instructions for an image builder optimizer (e.g., image builder optimizer 200 of FIG. 2) and/or a software library containing methods that call a translation module. While the machine-readable storage medium 928 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for creating and customizing a minimal installation of a virtual machine are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "creating" or "customizing" or "generating" or "storing" or "enabling" or "downloading" or "executing" or "modifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
receiving, by a processing device, a request to instantiate a virtual machine, wherein the request is associated with a software package to be installed on the virtual machine;
generating a minimal installation of an operating system, wherein the minimal installation comprises a virtual machine disk image;
modifying the virtual machine disk image, while the operating system is shut down, to allow remote access to the operating system for a known set of credentials;
instantiating the virtual machine disk image of the minimal installation of the operating system;
generating, by the processing device, a customized minimal installation of the operating system by installing the software package into the minimal installation of the operating system, while the operating system is running using the remote access for the known set of credentials;
modifying the virtual machine disk image, while the operating system is shut down, to remove the remote access for the known set of credentials while preserving additional remote access added during the customized minimal installation of the operating system; and
storing the virtual machine disk image comprising the customized minimal installation of the operating system.

2. The method of claim 1,
wherein the virtual machine disk image of the customized minimal installation of the operating system is used for a next request for the same software package, wherein the virtual machine disk image is a cloud generic virtual machine disk image.

3. The method of claim 1, further comprising:
enabling debug features during at least one of the generating the minimal installation or the generating the customized minimal installation to debug errors caused during at least one of the generating the minimal installation or the generating the customized minimal installation.

4. The method of claim 1, wherein generating the minimal installation of the operating system comprises:
downloading installation media of the operating system;
generating an automated installation file for the operating system using native operating system tools;
generating modified installation media by including the automated installation file in the downloaded installation media; and
executing a native operating system installer to install the minimal operating system in a virtual machine guest using the modified installation media.

5. The method of claim 1, wherein installing the software package comprises
executing a remote native operating system command to install the software package in the virtual machine.

6. The method of claim 1, wherein the software package comprises a user package.

7. The method of claim 1, wherein the virtual machine disk image is a cloud generic virtual machine disk image.

8. The method of claim 1, wherein the request is associated with a template representing the operating system and the software package, and wherein generating the customized minimal installation of the operating system comprises identifying the software package using the template and installing the identified software package into the minimal installation of the operating system running in the virtual machine.

9. A system comprising:
a memory; and
a physical processing device operatively coupled to the memory, the processing device to:
receive a request to instantiate a virtual machine, wherein the request is associated with a software package to be installed on the virtual machine;
generate a minimal installation of an operating system, wherein the minimal installation comprises a virtual machine disk image;
modify the virtual machine disk image, while the operating system is shut down, to allow remote access to the operating system for a known set of credentials;
instantiate the virtual machine disk image of the minimal installation of the operating system;
generate a customized minimal installation of the operating system by installing the software package into the minimal installation of the operating system, while the operating system is running using the remote access for the known set of credentials;
modify the virtual machine disk image, while the operating system is shut down, to remove the remote access for the known set of credentials while preserving additional remote access added during the customized minimal installation of the operating system; and
store the virtual machine disk image comprising the customized minimal installation of the operating system.

10. The system of claim 9, wherein the memory is to store the virtual machine disk image of the customized minimal installation of the operating system to be used for a next request for the same software package.

11. The system of claim 9, wherein the physical processing device is further to:
enable debug features during at least one of the generating the minimal installation or the generating the customized minimal installation to debug errors caused during at least one of the generating the minimal installation or the generating the customized minimal installation.

12. The system of claim 9, wherein to generate the minimal installation of the operating system, the physical processing device is further to:
download installation media of the operating system;
generate an automated installation file for the operating system using native operating system tools;
generate modified installation media by including the automated installation file in the downloaded installation media; and
execute a native operating system installer to install the minimal operating system in a virtual machine guest using the modified installation media.

13. The system of claim 9, wherein to generate the customized minimal installation of the operating system comprises the physical processing device to execute a remote native operating system command to install the software package in the virtual machine.

14. The system of claim 9, wherein the software package comprises a user package.

15. A non-transitory computer-readable medium including instructions that, when executed by a processing device, cause the processing device to:

receive, by the processing device, a request to instantiate a virtual machine, wherein the request is associated with a software package to be installed on the virtual machine;

generate a minimal installation of an operating system, wherein the minimal installation comprises a virtual machine disk image;

modify the virtual machine disk image, while the operating system is shut down to allow remote access to the operating system for a known set of credentials;

instantiate the virtual machine disk image of the minimal installation of the operating system;

generate, by the processing device, a customized minimal installation of the operating system by installing the software package into the minimal installation of the operating system, while the operating system is running using the remote access for the known set of credentials;

modify the virtual machine disk image, while the operating system is shut down, to remove the remote access for the known set of credentials while preserving additional remote access added during the customized minimal installation of the operating system; and store the virtual machine disk image comprising the customized minimal installation of the operating system.

16. The non-transitory computer-readable medium of claim 15, wherein the software package comprises a user package.

17. The non-transitory computer-readable medium of claim 15, wherein the virtual machine disk image of the customized minimal installation of the operating system is used for a next request for the same software package.

18. The non-transitory computer-readable medium of claim 15, wherein the processing device is further to:

enable debug features during at least one of the generating the minimal installation or the generating the customized minimal installation to debug errors caused during at least one of the generating the minimal installation or the generating the customized minimal installation.

19. The non-transitory computer-readable medium of claim 15, wherein to generate the minimal installation of the operating system, the processing device is further to:

download installation media of the operating system;

generate an automated installation file for the operating system using native operating system tools;

generate modified installation media by including the automated installation file in the downloaded installation media; and execute a native operating system installer to install the minimal operating system in a virtual machine guest using the modified installation media.

20. The non-transitory computer-readable medium of claim 15, wherein the installing the identified software package into the minimal installation of the operating system comprises the processing device to execute a remote native operating system command to install the software package in the virtual machine guest.

* * * * *